United States Patent
Gough et al.

(10) Patent No.: US 10,818,089 B2
(45) Date of Patent: Oct. 27, 2020

(54) SYSTEMS AND METHODS TO PROVIDE A SHARED INTERACTIVE EXPERIENCE ACROSS MULTIPLE PRESENTATION DEVICES

(71) Applicant: Disney Enterprises, Inc., Burbank, CA (US)

(72) Inventors: R. Hunter Gough, Burbank, CA (US); Hunter Gibson, Burbank, CA (US); Tri Desa, Burbank, CA (US); Christopher Painter, Burbank, CA (US); Brittany Bruegel, Burbank, CA (US); Maxwell McCoy, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/141,460

(22) Filed: Sep. 25, 2018

(65) Prior Publication Data
US 2020/0098179 A1 Mar. 26, 2020

(51) Int. Cl.
| | |
|---|---|
| *G06T 19/00* | (2011.01) |
| *G06T 11/60* | (2006.01) |
| *G06T 7/20* | (2017.01) |
| *G06T 7/00* | (2017.01) |
| *G09G 5/377* | (2006.01) |
| *G06F 3/01* | (2006.01) |
| *G06T 7/73* | (2017.01) |

(52) U.S. Cl.
CPC ............ *G06T 19/006* (2013.01); *G06F 3/011* (2013.01); *G06F 3/012* (2013.01); *G06F 3/013* (2013.01); *G06T 7/73* (2017.01); *G06T 7/74* (2017.01); *G09G 5/377* (2013.01); *G06T 2219/004* (2013.01); *G06T 2219/024* (2013.01)

(58) Field of Classification Search
CPC .......... G06F 3/011; G06F 3/012; G06F 3/013; G06T 19/006; G06T 2207/30204; G06T 7/73; G06T 7/74; G09G 5/377; A63F 13/06; A63F 13/10; A63F 13/213; A63F 13/424; A63F 13/65; A63F 13/525; A63F 13/5255; A63F 2300/204; A63F 2300/6045; A63F 2300/695; A63F 2300/6676; A63F 2300/69; A63F 2300/8058
USPC ........................................... 345/633, 632.659
See application file for complete search history.

(56) References Cited

U.S. PATENT DOCUMENTS

| | | | | |
|---|---|---|---|---|
| 2011/0304646 | A1* | 12/2011 | Kato | G09G 5/377 |
| | | | | 345/632 |
| 2012/0075285 | A1* | 3/2012 | Oyagi | G06T 19/006 |
| | | | | 345/419 |

(Continued)

*Primary Examiner* — Jin Cheng Wang
(74) *Attorney, Agent, or Firm* — Esplin & Associates, PC

(57) ABSTRACT

This disclosure presents systems and methods to provide a shared augmented reality experience across multiple presentation devices. A first presentation device may display an AR marker, and may use a map of the physical environment to correctly orient the AR marker with an orientation of an anchor object. A second presentation device may then scan the marker, which places the anchor object in the position and orientation in their perceived views of the virtual environment in accordance with the marker. Once the location of the anchor object is established, networking between the first and second devices can be used to place other virtual objects in the virtual environment.

20 Claims, 6 Drawing Sheets

(56) References Cited

U.S. PATENT DOCUMENTS

| | | | |
|---|---|---|---|
| 2012/0113228 A1* | 5/2012 | Konno | H04N 13/239 |
| | | | 348/47 |
| 2012/0172127 A1* | 7/2012 | Kitahara | G06T 19/006 |
| | | | 463/37 |
| 2012/0256961 A1* | 10/2012 | Ogasawara | A63F 13/211 |
| | | | 345/659 |
| 2013/0229396 A1 | 9/2013 | Huebner | |
| 2013/0235078 A1* | 9/2013 | Takahashi | G06T 11/00 |
| | | | 345/633 |
| 2013/0257907 A1* | 10/2013 | Matsui | G09G 5/377 |
| | | | 345/633 |
| 2014/0003651 A1 | 1/2014 | Smoot | |
| 2014/0078517 A1 | 3/2014 | Ben-Yishai | |
| 2015/0062162 A1* | 3/2015 | Kim | G06T 19/006 |
| | | | 345/633 |
| 2015/0123966 A1* | 5/2015 | Newman | G06T 19/006 |
| | | | 345/419 |
| 2015/0201188 A1 | 7/2015 | Pritch | |
| 2016/0189428 A1* | 6/2016 | Matsubayashi | G06T 19/006 |
| | | | 345/633 |
| 2016/0307374 A1* | 10/2016 | Kurz | G06T 19/006 |
| 2017/0287218 A1* | 10/2017 | Nuernberger | G06T 19/006 |
| 2018/0082430 A1* | 3/2018 | Sharma | G06T 7/246 |

\* cited by examiner

SYSTEMS AND METHODS TO PROVIDE A SHARED INTERACTIVE EXPERIENCE ACROSS MULTIPLE PRESENTATION DEVICES

FIELD

This disclosure relates to systems and methods to provide a shared interactive experience across multiple presentation devices.

BACKGROUND

Devices and systems are available to provide virtual reality (VR) and/or augmented reality (AR) experiences. In particular, handheld and/or wearable technology may be used. Wearable technology may include head-mounted displays (HMD). Handheld technology may include mobile computing platforms, such as smart phones and/or tablets.

SUMMARY

One aspect of the disclosure relates to a system configured to provide a shared interactive experience across multiple presentation devices. An interactive experience may take place in an interactive environment. An interactive environment may include one or more of a virtual reality environment, an augmented reality environment, and/or other interactive environment. An augmented reality environment may include views of images of virtual content within a virtual environment superimposed over views of a real-world environment. In some implementations, a user may actively view the real-world environment, for example, through a visor. In some implementations, a user may passively view the real-world environment, for example, through a display that presents images of the real-world environment. A virtual reality environment may include views of images of virtual content within a virtual environment. Virtual content may include one or more virtual objects and/or other virtual content. The terms "space" and "environment" in the context of virtual reality and/or augmented reality may be used interchangeably herein.

In SLAM (simultaneous localization and mapping) applications utilized in augmented reality and virtual reality systems, a device constructs its own interpretation of a geometry of a physical environment (referred to herein as a "map" or "environment record") by comparing images from a camera as the user moves the device around the environment. Even with identical devices in the same environment, the devices may not generate the exact same map of the physical environment, due to the randomness of the camera movement. Because of this, it may be difficult for multiple devices to share the same interactive experience, making in-person multiplayer interactive experiences unfeasible. One or more implementations of the system presented herein propose a solution to these and/or other problems by using a "host" user's device to display an augmented reality marker for the other users to detect. In some implementations, the host user's device determines where in a real-world environment to "place" a virtual object (referred to as the "anchor object"). Once the virtual object has been placed, the host user may then places their device directly inside of the virtual object. The device may then display an AR marker, and uses its map of the physical environment to correctly orient the AR marker with an orientation of the anchor object, regardless of how the user has placed the device. The other users may then scan the marker via their own devices, which places the anchor object in the correct position and orientation in their perceived views of the virtual environment as well. Once the location of the anchor object is established, networking between devices can be used to place other virtual objects in the virtual environment, with their locations consistent between the virtual environments of the users.

The system configured to provide a shared augmented reality experience across multiple presentation devices may include one or more presentation devices and/or other components.

A first presentation device may be a host device within the system. The first presentation device may be configured to generate images of virtual content and present the images such that the virtual content may be perceived by the user as being located in a real-world environment.

The first presentation device may include and/or may be coupled to non-transitory electronic storage. The non-transitory electronic storage may be configured to store one or more of virtual content information, environment record information, and/or other information. The virtual content information may define a virtual environment including virtual content. The virtual content may include one or more virtual objects. The environment record information may define a composition of a real-world environment. The composition of the real-world environment may include one or more reference points. The virtual environment may be specified with respect to the one or more reference points within the real-world environment.

The first presentation device may include and/or may be coupled to one or more physical processors. The one or more physical processors may be configured by machine-readable instructions. Executing the machine-readable instructions may cause the one or more physical processors to facilitate providing a shared interactive experience across multiple presentation devices. The machine-readable instructions may include one or more computer program components. The one or more computer program components may include one or more of an input component, a detection component, and/or other components.

The input component may be configured to obtain input to specify pose of one or more virtual objects. The pose of a virtual object may include one or more of a perceived location of the virtual object within the real-world environment, an object heading of the virtual object, and/or other characteristics. In some implementations, the input may specify pose of an anchor object.

The detection component may be configured to effectuate presentation of a marker on a display. The marker may have a marker heading. The detection component may be configured to determine a real-world location of the marker within the real-world environment. The detection component may be configured to, responsive to the real-world location of the marker matching the perceived location of the virtual object, modify the presentation of the marker so that the marker heading of the marker matches the object heading of the virtual object.

A second presentation device may be a participant in the system that utilizes the first presentation device to synchronize with an environment record of the first presentation device. The second presentation device may be configured to generate images of virtual content and present the images such that the virtual content may be perceived by the user as being located in a real-world environment.

The second presentation device may include and/or may be coupled to non-transitory electronic storage. The non-transitory electronic storage may be configured to store one or more of virtual content information, environment record information, and/or other information. The virtual content information may define a virtual environment including virtual content. The virtual content may include one or more virtual objects. The environment record information may define a composition of a real-world environment. The composition of the real-world environment may include one or more reference points. The virtual environment may be specified with respect to the one or more reference points within the real-world environment.

The second presentation device may include and/or may be coupled to one or more physical processors. The one or more physical processors may be configured by machine-readable instructions. Executing the machine-readable instructions may cause the one or more physical processors to facilitate providing a shared interactive experience across multiple presentation devices. The machine-readable instructions may include one or more computer program component. The one or more computer program components may include one or more of a detection component, a map component, and/or other components.

The detection component may be configured to detect presence of a marker within the real-world environment. The detection component may be configured to determine a real-world location of the marker within the real-world environment.

The map component may be configured to specify, within the environment record information, the real-world location of the marker as a first reference point within the real-world environment so that the virtual environment may be specified with respect to the real-world location of the marker.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
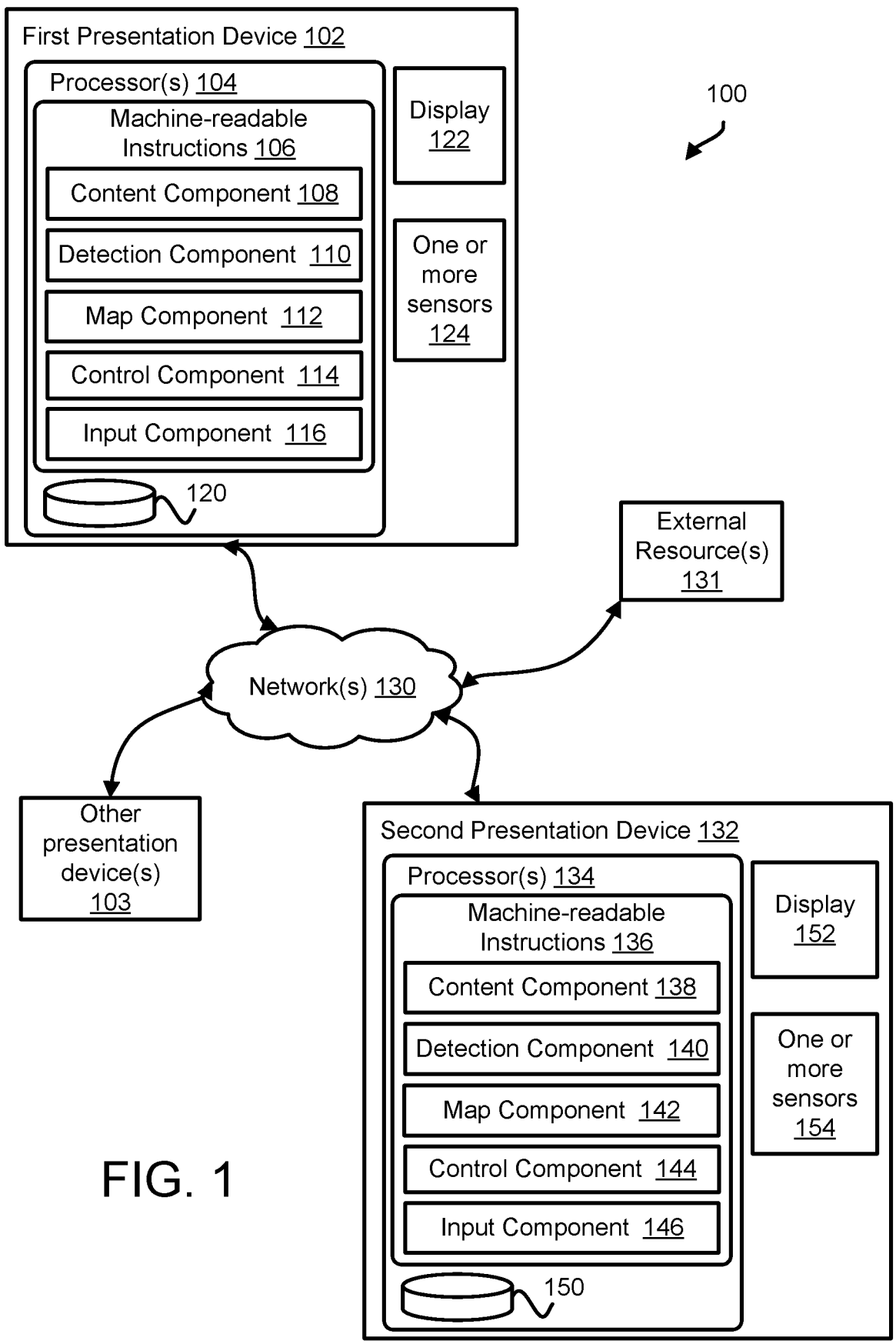
FIG. 1 illustrates a system configured to provide a shared interactive experience across multiple presentation devices, in accordance with one or more implementations.

FIG. 1 illustrates a system 100 configured to provide a shared interactive experience across multiple presentation devices, in accordance with one or more implementations.

An interactive experience may include one or more of playing a game, interacting with virtual content, interacting with real-world object, interacting with other users, and/or other experiences. An interactive experience may take place in an interactive space. An interactive space may include one or more of an augmented reality (AR) environment, a virtual reality (VR) environment, and/or other interactive spaces. An augmented reality environment may include views of images of virtual content within a virtual environment superimposed over views of a real-world environment. In some implementations, a user may actively view the real-world environment, for example, through a visor. In some implementations, a user may passively view the real-world environment, for example, through a display that presents images of the real-world environment. A virtual reality environment may include views of images of virtual content within a virtual environment. Virtual content may include one or more virtual objects and/or other virtual content. The terms "space" and "environment" in the context of virtual reality and/or augmented reality may be used interchangeably herein.

The system 100 may include one or more of a first presentation device 102, a second presentation device 132, one or more other presentation devices 103, one or more external resources 131, and/or other components. While some descriptions herein may be directed to features and/or functions of first presentation device 102 and/or second presentation device 132, it is to be noted that other ones of one or more other presentation devices 103 may be configured similarly as first presentation device 102 and/or second presentation device 132. Further, it is noted that the features and/or functions of first presentation device 102 may be attributed to second presentation device 132, and vis versa.

The first presentation device 102 may include one or more of one or more physical processors 104, non-transitory electronic storage 120, a display 122, one or more sensors 124, and/or other components. The first presentation device 102 may be a "host" within system 100.

One or more physical processors 104 may be configured to provide information-processing capabilities in first presentation device 102. As such, in some implementations, processor(s) 104 may include one or more of a digital processor, an analog processor, a digital circuit designed to process information, an analog circuit designed to process information, a state machine, and/or other mechanisms for electronically processing information.

In some implementations, one or more physical processors 104 may be configured to provide remote hosting of features and/or functions of machine-readable instructions 106 to first presentation device 102. In some implementations, one or more physical processors 104 may be remotely located from first presentation device 102. The one or more physical processors 104 may communicate with first presentation device 102, via client/server architecture, and/or other communication schemes. By way of non-limiting illustration, one or more physical processors 104 may comprise one or more servers and/or one or more computing platforms.

In some implementations, one or more physical processors 104 may be configured to provide local hosting of features and/or functions of machine-readable instructions 106 to first presentation device 102. In some implementations, one or more physical processors 104 may be included with and/or coupled to first presentation device 102. The one or more physical processors 104 may communicate with first presentation device 102 via local wired and/or wireless connections (e.g., USB, BLE and/or other connections), and/or other communication schemes.

In some implementations, one or more physical processors 104 may be removably coupled to first presentation device 102. By way of non-limiting illustration, one or more physical processors 104 may be included in a mobile computing platform (not shown in FIG. 1). The mobile computing platform may include one or more of a cellular telephone, a smartphone, a laptop, a tablet computer, an AR/VR platform, and/or other computing platform. The mobile computing platform may be removably attachable to first presentation device 102.

In some implementations, first presentation device 102 may itself comprise a mobile computing platform. The mobile computing platform may include one or more of a cellular telephone, a smartphone, a laptop, a tablet computer, and/or other computing platform. Such an implementation may provide an augmented reality environment with passive views of the real world.

The display 122 may be configured to present virtual content, views of the real world, and/or other content. Virtual content may be in the form of images, video, text, and/or other content. Views of the real-world may be in the form of images and/or video. Presentation of content via display 122 of first presentation device 102 may be facilitated by control signals communicated to display 122 (see, e.g., control component 114). The display 122 may include one or more of a screen, a set of screens, a touchscreen, a monitor, and/or other displays.

In some implementations, display 122 may be configured to present virtual content individually to each eye of a user as stereoscopic pairs. In some implementations, first presentation device 102 may comprise, for example, a headset (not shown in FIG. 1). When first presentation device 102 is installed on a user's head, the user's gaze may be directed towards first presentation device 102 (or at least display 122) to view content presented by and/or on display 122.

In some implementations, display 122 may include one or more of a transparent, semi-transparent, reflective, and/or semi-reflective display component. Images of virtual content may be presented on display 122 such that the user may view the images presented on display 122 as well as the real-world through display 122. The virtual content may be perceived as being present in the real world. Such a configuration may provide an interactive space comprising an augmented reality environment with an active view of the real world.

In some implementations, display 122 may comprise a display screen configured to present virtual content. The user may view the display screen such that the display screen may encompass, substantially or entirely, the users vision without providing views of the real-world through the display screen. Such a configuration may provide an interactive space comprising a virtual reality environment.

Individual sensors of one or more sensors 124 may be configured to generate output signals. In some implementations, an individual sensor may include one or more of an orientation sensor, a depth sensor, an image sensor, a location, and/or other sensors.

An orientation sensor may be configured to generate output signals conveying orientation information and/or other information. Orientation information derived from output signals of an orientation sensor may define an orientation of first presentation device 102. In some implementations, orientation of first presentation device 102 may refer to one or more of a pitch angle, a roll angle, a yaw angle, a heading, a pointing direction, a bearing, and/or other measurements. An orientation sensor may include an inertial measurement unit (IMU) such as one or more of an accelerometer, a gyroscope, a magnetometer, Inclinometers, and/or other devices.

In some implementations, an image sensor may be configured to generate output signals conveying image information. Image information may define images of the real world. Image information may specify visual content within a field of view of the image sensor. The visual content may include real-world objects and/or surfaces present in the real world. The image information may specify visual content in the form of pixels in an image. Pixels may be defined by one or more of location (e.g., two-dimensional coordinates), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

The images of the real world may be used to detect presence of augmented reality markers in the real world. Detection of presence of augmented reality markers may be performed using one or more image-processing techniques. One or more image processing techniques may include one or more of bundle adjustment, speeded up robust features (SURF), scale-invariant feature transform (SIFT), computer vision, and/or other techniques. In some implementations, an augmented reality marker may include one or more of a picture, a glyph, a shape, and/or other marker.

In some implementations, a depth sensor may be configured to generate output signals conveying depth information and/or other information. Depth information may include distance and/or range of real-world surfaces and/or objects from the depth sensor, and/or other information. In some implementations, depth information may be provided in the form of a point cloud. A point cloud may include a set of points. Individual points may represent individual surfaces within the real world. The depth information may specify, for individual points, one or more of an individual distance of the point from the depth sensor, an individual orientation of the point with respect to the depth sensor, and/or other information. In some implementations, a depth sensor may comprise one or more of a time-of-flight sensor, a structured light sensor, an unstructured light sensor, an active stereo pair, a passive stereo pair, and/or other depth sensing devices.

In some implementations, a location sensor may be configured to generate output signals conveying location information and/or other information. Location information may include location of the location sensor within the real-world environment. The location may be specified with respect to a location composition included in an environment record. In some implementations, a location sensor may comprise a global position system (GPS), and/or other location sensing devices.

The non-transitory electronic storage 120 may be configured to store one or more of virtual content information, environment record information, and/or other information.

The environment record information may include one or more environment records. A environment record may include information describing aspects of a particular real-world environment. In general, information describing aspects of an real-world environment may provide an understanding of a composition of the real-world environment, referred to as a "location composition." The location composition of a real-world environment may define one or more of physical dimensions of the environment, objects and/or surfaces present in and/or moving through the environment, and/or other information related to the composition of the environment. In some implementations, a location composition may include one or more reference points and/or other information. A reference point may be related to a visually salient 3D feature point in the environment. A reference point may be specified by one or more of a 3D position of that point, a 2D position of the reference point as seen in one or more images, a descriptor including a uniquely, or nearly-uniquely identifying description of an appearance of the immediate surroundings of that reference point, a timestamp of when the reference point was created, a quantifier of an uncertainty regarding the 3D position, and/or other information.

The virtual content information may define a virtual environment including virtual content. The virtual content may include one or more virtual objects. The virtual environment may be specified with respect to the one or more reference points included in a location composition of an environment record. The one or more reference points included in a location composition of an environment record may provide points of reference for specifying the portions of the virtual environment and/or specifying where virtual objects may be placed. In some implementations, a reference point may act as a point of origin for a coordinate system of the virtual environment and/or location composition.

The one or more physical processors 104 may be configured by machine-readable instructions 106. Executing machine-readable instructions 106 may cause one or more physical processors 104 to facilitate providing a shared augmented reality experience across multiple presentation devices. The machine-readable instructions 106 may include one or more computer program components. The one or more computer program components may include one or more of a content component 108, a detection component 110, a map component 112, a control component 114, an input component 116, and/or other components.

The content component 108 may be configured to obtain virtual content information, environment record information, and/or other information stored by electronic storage 120 and/or other storage locations.

The control component 114 may be configured to control first presentation device 102 (e.g., via display 122) to generate and present images of virtual content. By way of non-limiting illustration, control component 114 may be configured to control first presentation device 102 to generate an image of a first virtual object. The first virtual object may comprise an anchor object that may facilitate syncing the environment records generated by first presentation device 102, second presentation device 132, and/or one or more other presentation devices 103.

The input component 116 may be configured to obtain input to specify pose of virtual objects. A pose of the virtual object may include one or more of a perceived location of the virtual object within a real-world environment, an object orientation of the virtual object, and/or other information. Object orientation may refer to one or more of an object pitch angle, an object roll angle, an object yaw angle, an object heading, an object pointing direction, an object bearing, and/or other measurements. In some implementations, the pose may be specified automatically by input component 116 and/or without user input. By way of non-limiting illustration, input component 116 may pose a virtual object having one or more of an arbitrary location of the virtual object within a real-world environment, an arbitrary object orientation of the virtual object, and/or other pose. In some implementations, input component 116 may be configured to obtain input to specify pose of an anchor object.

In some implementations, input component 116 may be configured to obtain user input to specify pose of virtual objects. The user input may comprise gesture-based input, physical interaction with one or more components of system 100, and/or other input. In some implementations, user input may be derived from one or more of sensor output of one or more sensors 124, interaction with display 122, and/or other sources.

The input component 116 may be configured to detect and/or recognize one or more real-world objects based on sensor output from one or more sensors 124. A real-world object may include, for example, a human hand and/or other user appendage. One or more real-world objects may be recognized based on one or more point clouds having points lying on one or more surface of the one or more real-world objects. By way of non-limiting illustration, a point cloud having a shape of a known real-world object (e.g., a human hand) may be recognized as the real-world object. Recognition of a real-world object may include identification of the presence of the real-world object.

In some implementations, input component 116 may be configured to identify gestures and/or actions being performed by a hand. A gesture and/or action may include one or more of reaching, grabbing, releasing, swiping, pinching, pulling, throwing, clicking, pointing, pushing, and/or other gestures and/or actions of real-world objects.

In some implementations, display 122 may comprise a touchscreen display on which a user may physically interact. A user may interact with display 122 to pose a virtual object. By way of non-limiting illustration, a user may interact with display 122 with actions such as touching, swiping, pinching, moving, and/or other actions to pose a virtual object shown on display 122.

The control component 114 may be configured to control first presentation device 102 to generate an image of the anchor object having the pose obtained by input component 116.

The detection component 110 may be configured to effectuate presentation of a marker on display 122. The marker may have a marker orientation. The marker orientation may refer to one or more of a marker pitch angle, a marker roll angle, a marker yaw angle, a marker heading, a marker pointing direction, a marker bearing, and/or other measurements. After the anchor object has been posed and/or the marker presented, control component 114 may be configured to control first presentation device 102 to effectuate presentation of a notification to the user of first presentation device 102 to place first presentation device 102 and/or display 122 at or near the perceived location of the anchor object. In some implementations, "at or near" may mean inside the anchor object as perceived by the viewing user.

The detection component 110 may be configured to determine one or more of a real-world location of the marker within the real-world environment, a marker orientation, and/or other information. The detection component 110 may determine the real-world location of the marker based on the known location composition of the real-world environment, output signals from one or more sensors 124, and/or other information.

In some implementations, detection component 110 may be configured to determine whether the real-world location of the marker matches the perceived location of the anchor object. By way of non-limiting illustration, detection component 110 may compare the perceived location of the anchor object with the real-world location of the marker to determine a match. The detection component 110 may utilize the environment record information conveying the location composition of the real-world environment to determine one or more of the perceived location of the anchor object and/or the real-world location of the marker. In some implementations, a match may be determined if the perceived location and the real-world location are within a threshold distance. The threshold distance may be in the range of zero to ten centimeters and/or other range. In some implementations, the anchor object may have a perceptible volume such that the placement of the anchor object may create a footprint encompassing an area on a surface the anchor object may be placed. In some implementations, a match may be determined if the real-world location of the marker lies within the footprint. This may correspond to the user placing the marker "inside" the anchor object.

In some implementations, detection component 110 may be configured to, responsive to the real-world location of the marker matching the perceived location of the anchor object, modify the presentation of the marker so that the marker orientation matches the object orientation of the virtual object. Modifying the presentation of the marker so that the marker orientation matches the object orientation of the virtual object may include rotating the marker until the marker orientation matches the object orientation of the virtual object. In some implementations, marker orientation may include a marker heading and the object orientation may include an object heading. In some implementations, matching the marker heading to the objection heading may include determining that the marker heading is aligned with the objection heading. Alignment may mean that the marker heading is parallel with the object heading. In some implementations, alignment may mean that the marker heading is within a threshold degree off of parallel with object heading. The threshold degree may be in the range of zero to twenty degrees off of parallel. The marker may now be in a state to provide a synchronization of the environment record information generated by first presentation device 102 with environment record information generated by other presentation devices.

In some implementations, detection component 110 may be configured to, responsive to the real-world location of the marker matching the perceived location of the anchor object and the marker orientation not matching the object orientation of the anchor object, effectuate presentation of one or more notifications via display 122 prompting the user of first presentation device 102 to change the orientation of display 122 until the marker orientation matches the object orientation of the anchor object. In some implementations, detection component 110 may be configured to, responsive to the real-world location of the marker matching the perceived location of the anchor object and the marker orientation matching the object orientation of the anchor object, effectuate presentation of one or more notifications via display 122 prompting the user of first presentation device 102 that the marker orientation matches the object orientation of the anchor object. The prompt may include one or more of an illumination of light, a presentation of text, a presentation of sound, and/or other prompt.

In some implementations, detection component 110 may be configured to, responsive to the real-world location of the marker matching the perceived location of the anchor object and the marker orientation not matching the object orientation of the anchor object, effectuate presentation of one or more notifications via display 122 prompting the user of first presentation device 102 to change the orientation of the anchor object until the marker orientation matches the object orientation of the anchor object. In some implementations, detection component 110 may be configured to, responsive to the real-world location of the marker matching the perceived location of the anchor object and the marker orientation matching the object orientation of the anchor object, effectuate presentation of one or more notifications via display 122 prompting the user of first presentation device 102 that the marker orientation matches the object orientation of the virtual object. The prompt may include one or more of an illumination of light, a presentation of text, a presentation of sound, and/or other prompt.

The map component 112 may be configured to determine environment record information and/or other information. The map component 112 may be configured to determine environment record information from information conveyed by output signals of one or more sensors 124, and/or other information. Techniques to determine environment record information may include one or more of simultaneous localization and mapping (SLAM), parallel tracking and mapping (PTAM), particle filter localization, image registration, stereophotogrammetry, Speeded Up Robust Features (SURF), Scale-Invariant Feature Transform (SIFT), Oriented FAST (Features from Accelerated Segment Test) and rotated BRIEF (Binary Robust Independent Elementary Features) (ORB), Binary Robust Invariant Scalable Keypoints (BRISK), and/or other techniques. These techniques may utilize, as input, output signals from individual sensors of one or more sensors 124 including one or more of an image sensor, a depth sensor, an orientation sensor, a location sensor, and/or other sensors.

In some implementations, map component 112 may be configured to specify, within the environment record information, a real-world location of the marker (which has been presented via display 122 and matches a perceived location of an anchor object) as a reference point within a location composition of a real-world environment. By doing so, a virtual environment presented by first presentation device 102 may be specified with respect to the real-world location of the marker and/or other information. The second presentation device 132 may subsequently detect the presence of marker and determine the real-world location of the marker. The second presentation device 132 may use the real-world location of the marker as a reference point within its own a location composition of a real-world environment. This may result in the first presentation device 102 and the second presentation device 132 having synced environment records.

The second presentation device 132 may include one or more of one or more physical processors 134, non-transitory electronic storage 150, a display 152, one or more sensors 154, and/or other components. The second presentation device 132 may be a participant within system 100 that utilizes information provided by first presentation device 102.

One or more physical processors 134 may be configured to provide information-processing capabilities in second presentation device 132. The one or more physical processors 134 may be the same as or similar to one or more physical processors 104 of first presentation device 102, described herein. That is, one or more physical processor 134 of second presentation device 132 may provide the same or similar functionality to second presentation device 132 as one or more physical processors 104 provides to first presentation device 102.

The display 152 may be the same as or similar to display 122 of first presentation device 102, described herein. That is, display 152 of second presentation device 132 may provide the same or similar functionality to second presentation device 132 as display 122 provides to first presentation device 102.

The one or more sensors 154 may be the same as or similar to one or more sensors 124 of first presentation device 102, described herein. That is, one or more sensors 154 of second presentation device 132 may provide the same or similar functionality to second presentation device 132 as one or more sensors 124 provides to first presentation device 102.

The non-transitory electronic storage 150 may be configured to store one or more of virtual content information, environment record information, and/or other information. The environment record information may include one or more environment records.

The one or more physical processors 134 may be configured by machine-readable instructions 136. Executing machine-readable instructions 136 may cause one or more physical processors 134 to facilitate providing a shared augmented reality experience across multiple presentation devices. The machine-readable instructions 136 may include one or more computer program components. The one or more computer program components may include one or more of a content component 138, a detection component 140, a map component 142, a control component 144, an input component 146, and/or other components.

The content component 138 may be configured to obtain virtual content information and/or other information stored by electronic storage 150 and/or other storage locations.

The detection component 140 may be configured to perform one or more of detect presence of individual markers within a real-world environment, determine locations of the individual markers within the real-world environment, determine marker orientations of the individual markers within the real-world environment, and/or other operations.

In some implementations, detection component 140 may detect the presence of individual markers within a field of view of an image sensor included in one or more sensors 124. Detection component 140 may obtain the output signals generated by the image sensor. Detection component 140 may detect the presence of individual markers based on image information conveyed by the output signals, and/or other information. The image information may define visual content depicting the individual markers, and/or other content. In some implementations, detection component 140 may utilize one or more image processing techniques to detect presence of the individual markers, determine locations of the individual markers within the real-world environment, determine marker orientations of the individual markers within the real-world environment, and/or perform other operations. One or more image processing techniques may include one or more of bundle adjustment, speeded up robust features (SURF), scale-invariant feature transform (SIFT), computer vision, and/or other techniques.

The map component 142 may be configured to determine environment record information and/or other information. The map component 142 may be configured to determine environment record information from information conveyed by output signals of one or more sensors 154, individual locations of individual markers, and/or other information. Techniques to determine environment record information may include one or more of simultaneous localization and mapping (SLAM), parallel tracking and mapping (PTAM), particle filter localization, image registration, stereophotogrammetry, Speeded Up Robust Features (SURF), Scale-Invariant Feature Transform (SIFT), Oriented FAST (Features from Accelerated Segment Test) and rotated BRIEF (Binary Robust Independent Elementary Features) (ORB), Binary Robust Invariant Scalable Keypoints (BRISK), and/or other techniques. These techniques may utilize, as input, output signals from individual sensors of one or more sensors 124 including one or more of an image sensor, a depth sensor, an orientation sensor, and/or other sensors.

In some implementations, map component 142 may be configured to specify, within the environment record information, individual real-world locations of one or more detected markers as individual reference points within a location composition of a real-world environment. By doing so, a virtual environment presented by second presentation device 132 may be specified with respect to the real-world locations of one or more markers (which have been placed and oriented by first presentation device 102).

The control component 144 may be configured to control second presentation device 132 (e.g., via display 152) to generate and present individual images of individual virtual objects. In some implementations, the generation and/or presentation of individual images of individual virtual objects may be based on one or more of marker locations of individual markers, marker orientations of individual markers, and/or other information. By way of non-limiting illustration, control component 144 may be configured to control second presentation device 132 to generate an image of the anchor object and/or other virtual objects. The image may be generated so that the anchor object may be posed in the real-world environment. The pose of the anchor object may include one or more of a perceived location of the virtual object within the real-world environment, object orientation of the anchor object, and/or other pose information. In some implementations, the perceived location may be the real-world location of the detected marker. In some implementations, the object orientation may be the marker orientation.

The input component 146 may be configured to obtain input including user input via one or more input techniques described herein.

FIGS. 3-7 illustrate various implementations of the system of FIG. 1 configured to provide a shared interactive experience across multiple presentation devices.

Figure 3:
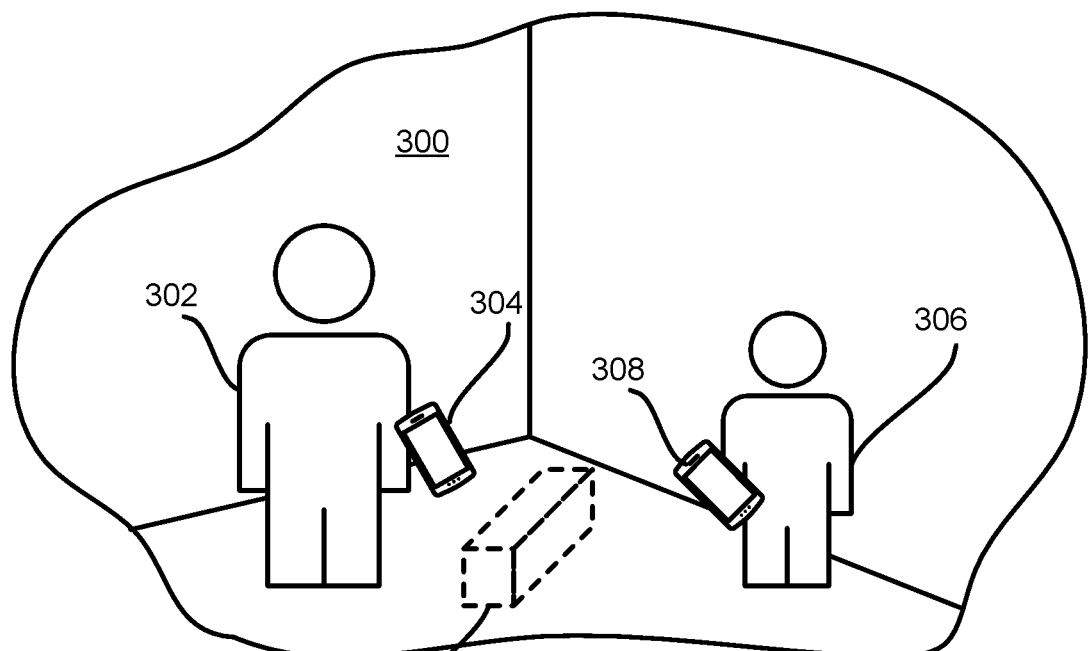
FIG. 3 shows a graphic illustration of an implementation of the system of FIG. 1.

FIG. 3 shows a graphic illustration of an implementation of the system of FIG. 1. FIG. 3 illustrates an interactive environment 300 including one or more of a first user 302, a first presentation device 304 used by the first user 302, a second user 306, a second presentation device 308 used by the second user 306, and/or other content and/or components. In the interactive environment 300, the first user 302 may pose an anchor object 310.

Figure 4:
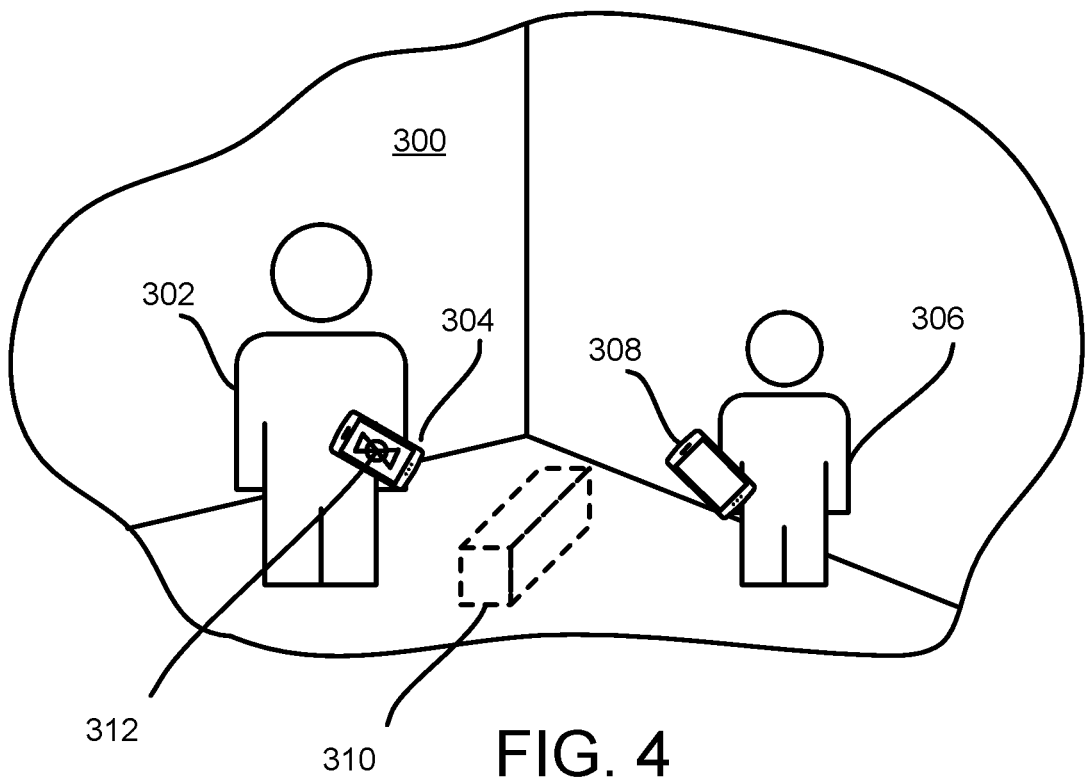
FIG. 4 shows a graphic illustration of an implementation of the system of FIG. 1.

FIG. 4 shows another graphic illustration of an implementation of the system of FIG. 1. In FIG. 4, the first presentation device 304 may present a marker 312. The first user 302 may be prompted to place the first presentation device 304 inside the anchor object 310.

Figure 5:
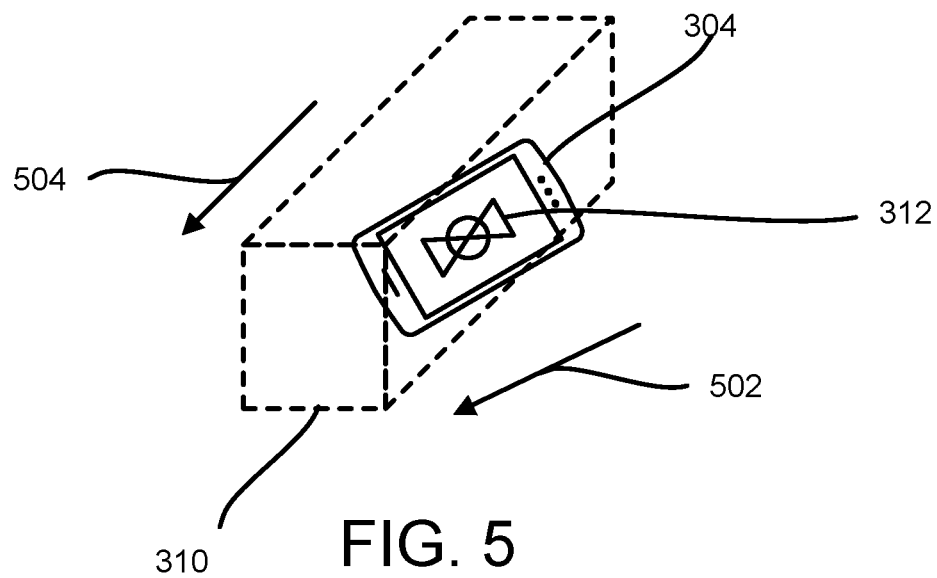
FIG. 5 shows a graphic illustration of an implementation of the system of FIG. 1.

FIG. 5 shows yet another graphic illustration of an implementation of the system of FIG. 1. In FIG. 5, a close-up of the anchor object 310 and the marker 312 displayed on first presentation device 304 is shown. The anchor object 310 may have an object orientation, graphically shown by directional arrow 504. The maker 312 may have a marker orientation, graphically shown by directional arrow 502. The first presentation device 304 may use its map of the physical environment to correctly orient the marker 312 with the anchor object 31, regardless of how the user has placed the first presentation device 304.

Figure 6:
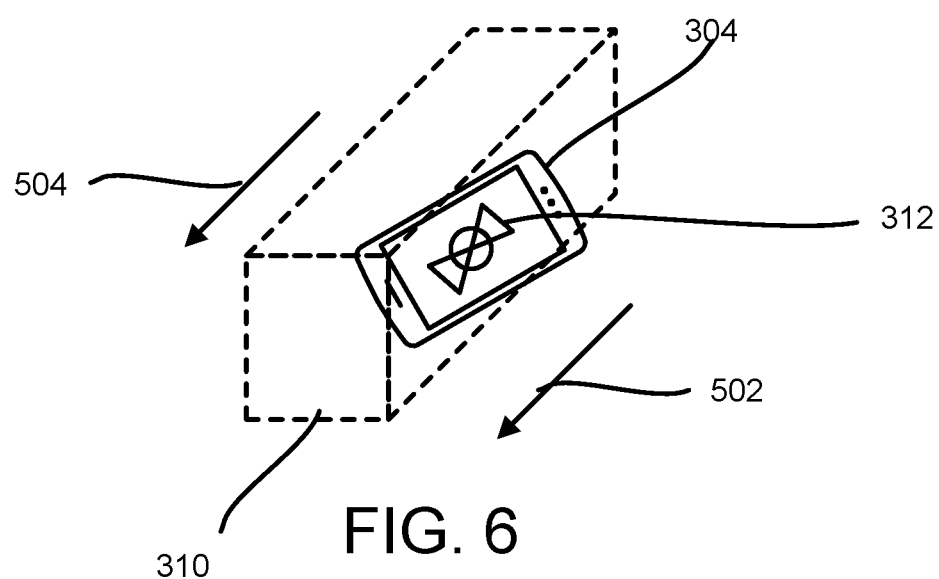
FIG. 6 shows a graphic illustration of an implementation of the system of FIG. 1.

FIG. 6 shows still another graphic illustration of an implementation of the system of FIG. 1. In FIG. 6, the close-up of the anchor object 310 and the marker 312 displayed on first presentation device 304 is shown. The marker 312 may be rotated until the marker orientation and the object orientation match. This is graphically shown by directional arrow 504 being substantially parallel with directional arrow 502.

Figure 7:
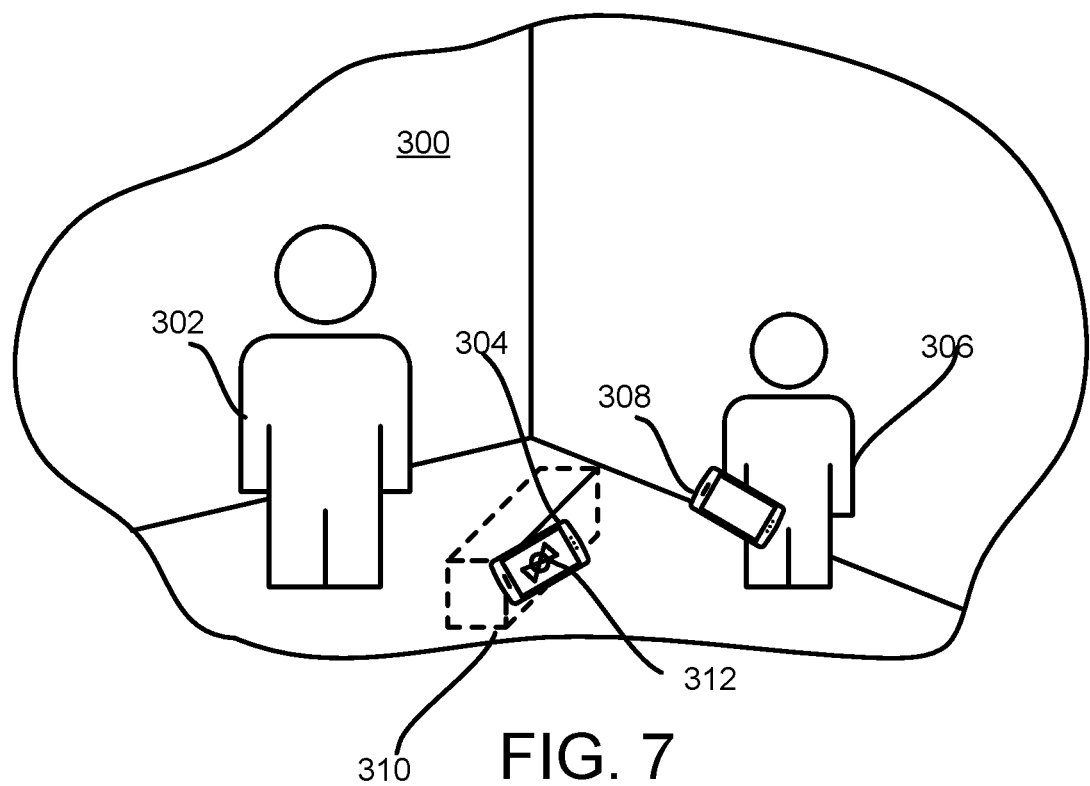
FIG. 7 shows a graphic illustration of an implementation of the system of FIG. 1.

FIG. 7 shows still yet another graphic illustration of an implementation of the system of FIG. 1. FIG. 7 illustrates the interactive environment 300 including one or more of the first user 302, the first presentation device 304 used by the first user 302, the second user 306, and the second presentation device 308 used by the second user 306. The first presentation device 304 displaying the marker 312 is shown relative the anchor object 310 in the configuration shown in the close-up of FIG. 6. The second user 306 may use the second presentation device 308 to perform one or more of detecting presence of the marker 312, determining a location of the marker 312, determining a marker orientation of the marker, presenting an image of the anchor object 310 so that the second user 306 may perceived the anchor object 310, and/or other features and/or functions described herein.

Returning to FIG. 1, external resource(s) 131 may include sources of information, hosts, and/or providers of information outside of system 100, external entities participating with system 100, and/or other resources. In some implementations, some or all of the functionality attributed herein to external resource(s) 131 may be provided by resources included in system 100. By way of non-limiting illustration, an external entity may include a server configured to provide virtual content information and/or other information.

Individual presentation devices may include communication lines or ports to enable the exchange of information with one or more networks 130. The one or more networks 130 may include wired and/or wireless connections. By way of non-limiting illustration, one or more networks 130 may include one or more of the Internet, wireless Bluetooth Low Energy (BLE), wired Universal Serial Bus (USB) connection, and/or other connections. It will be appreciated that this is not intended to be limiting and that the scope of this disclosure includes implementations in which components of system 100 may be operatively linked via some other communication media.

Illustration of the first presentation device 102 in FIG. 1 is not intended to be limiting. The first presentation device 102 may include a plurality of hardware, software, and/or firmware components operating together to provide the functionality attributed herein to the presentation devices. For example, first presentation device 102 may be implemented by a cloud of computing platforms operating together.

Illustration of the second presentation device 132 in FIG. 1 is not intended to be limiting. The second presentation device 132 may include a plurality of hardware, software, and/or firmware components operating together to provide the functionality attributed herein to the presentation devices. For example, second presentation device 132 may be implemented by a cloud of computing platforms operating together.

Electronic storage 120 of first presentation device 102 may include electronic storage media that electronically stores information. The electronic storage media of electronic storage 120 may include one or both of system storage that is provided integrally (i.e., substantially non-removable) with first presentation device 102 and/or removable storage that is removably connectable to first presentation device 102 via, for example, a port or a drive. A port may include a USB port, a firewire port, and/or other port. A drive may include a disk drive and/or other drive. Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 104, information received from external resource(s) 131, and/or other information that enables system 100 to function as described herein. Electronic storage 150 of second presentation device 132 may have similarly features and/or may provide similarly functionality to second presentation device 132 as electronic storage 120 provides to first presentation device 102.

Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-116. Processor(s) 104 may be configured to execute components 108-114 by software; hardware; firmware; some combination of software, hardware, and/or firmware; and/or other mechanisms for configuring processing capabilities on processor(s) 104.

It should be appreciated that although components 108-116 are illustrated in FIG. 1 as being co-located within a single processing unit, in implementations in which processor(s) 104 includes multiple processing units, one or more of components 108-116 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-116 described above is for illustrative purposes and is not intended to be limiting, as any of components 108-116 may provide more or less functionality than is described. For example, one or more of components 108-116 may be eliminated, and some or all of its functionality may be provided by other ones of components 108-116 and/or other components. As another example, processor(s) 104 may be configured to execute one or more additional components that may perform some or all of the functionality attributed to one of components 108-116.

Although processor(s) 134 is shown in FIG. 1 as a single entity, this is for illustrative purposes only. In some implementations, processor(s) 134 may include one or more processing units. These processing units may be physically located within the same device, or processor(s) 134 may represent processing functionality of a plurality of devices operating in coordination. The processor(s) 134 may be configured to execute components 138-146. Processor(s) 134 may be configured to execute components 138-146 by software; hardware; firmware; some combination of software, hardware, and/or firmware; and/or other mechanisms for configuring processing capabilities on processor(s) 134.

It should be appreciated that although components 138-146 are illustrated in FIG. 1 as being co-located within a single processing unit, in implementations in which processor(s) 134 includes multiple processing units, one or more of components 138-146 may be located remotely from the other components. While computer program components are described herein as being implemented via processor(s) 134 through machine readable instructions 136, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 138-146 described above is for illustrative purposes and is not intended to be limiting, as any of components 138-146 may provide more or less functionality than is described. For example, one or more of components 138-146 may be eliminated, and some or all of its functionality may be provided by other ones of components 138-146 and/or other components. As another example, processor(s) 134 may be configured to execute one or more additional components that may perform some or all of the functionality attributed to one of components 138-146.

Figure 2A:
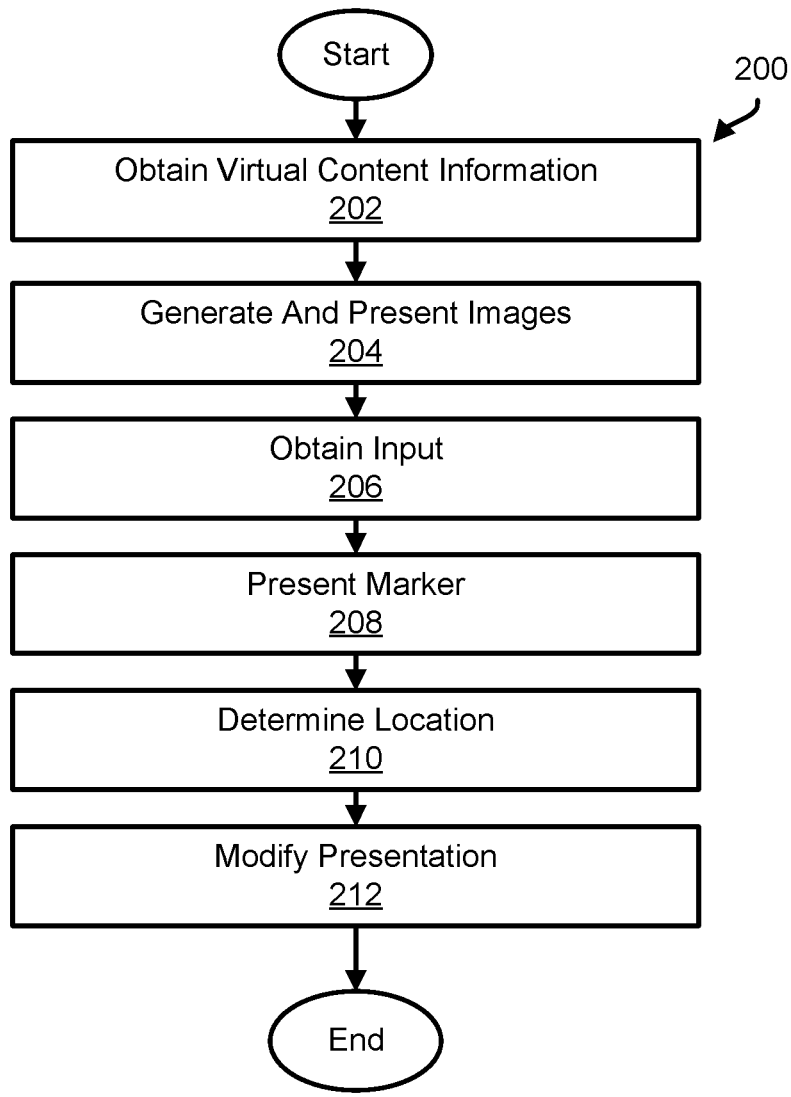
FIG. 2A illustrates a method to provide a shared interactive experience across multiple presentation devices, in accordance with one or more implementations.

FIG. 2A illustrates a method 200 to provide a shared augmented reality experience across multiple presentation devices, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2A and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200. By way of non-limiting illustration, method 200 may be implemented in a presentation device the same as or similar to first presentation device 102 (shown in FIG. 1 and described herein).

At an operation 202, virtual content information and/or other information may be obtained. The virtual content information may define a virtual environment including virtual content. The virtual content may include one or more virtual objects. In some implementations, operation 202 may be performed by one or more physical processors executing a content component the same as or similar to content component 108 (shown in FIG. 1 and described herein).

At an operation 204, images of the virtual content may be generated and presented such that the virtual content may be perceived by a user as being located in a real-world environment. In some implementations, operation 204 may be performed by one or more physical processors executing a control component the same as or similar to control component 114 (shown in FIG. 1 and described herein).

At an operation 206, input to specify a pose of a virtual object may be obtained. The pose of the virtual object may include one or more of a perceived location of the virtual object within the real-world environment, an object heading of the virtual object, and/or other information. In some implementations, operation 206 may be performed by one or more physical processors executing an input component the same as or similar to input component 116 (shown in FIG. 1 and described herein).

At an operation 208, presentation of a marker on a display may be effectuated. The marker may have a marker heading and/or other features. In some implementations, operation 208 may be performed by one or more physical processors executing a detection component the same as or similar to detection component 110 (shown in FIG. 1 and described herein).

At an operation 210, a real-world location of the marker within the real-world environment may be determined. In some implementations, operation 210 may be performed by one or more physical processors executing a detection component the same as or similar to detection component 110 (shown in FIG. 1 and described herein).

At an operation 212, responsive to the real-world location of the marker matching the perceived location of the virtual object, the presentation of the marker may be modified so that the marker heading of the marker matches the object heading of the virtual object. In some implementations, operation 212 may be performed by one or more physical processors executing a detection component the same as or similar to detection component 110 (shown in FIG. 1 and described herein).

Figure 2B:
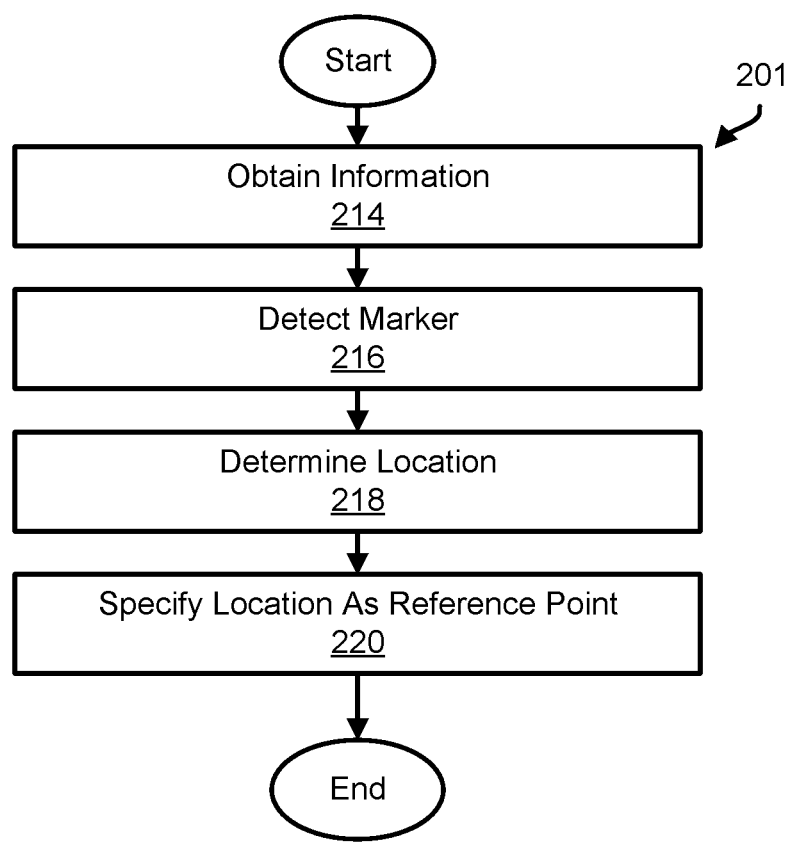
FIG. 2B illustrates a method to provide a shared interactive experience across multiple presentation devices, in accordance with one or more implementations.

FIG. 2B illustrates a method 201 to provide a shared augmented reality experience across multiple presentation devices, in accordance with one or more implementations. The operations of method 201 presented below are intended to be illustrative. In some implementations, method 201 may be accomplished with one or more additional operations not described, and/or without one or more of the operations discussed. Additionally, the order in which the operations of method 201 are illustrated in FIG. 2B and described below is not intended to be limiting.

In some implementations, method 201 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 201 in response to instructions stored electronically on electronic storage media. The one or more processing devices may include one or more devices configured through hardware, firmware, and/or software to be specifically designed for execution of one or more of the operations of method 200. By way of non-limiting illustration, method 201 may be implemented in a presentation device the same as or similar to second presentation device 132 (shown in FIG. 1 and described herein).

At an operation 214, one or more of virtual content information, environment record information, and/or other information may be obtained. The environment record information may define a composition of a real-world environment. The composition of the real-world environment may include one or more reference points. The virtual content information may define a virtual environment including virtual content. The virtual content may include one or more virtual objects. The virtual environment may be specified with respect to the one or more reference points within the real-world environment. In some implementations, operation 214 may be performed by one or more physical processors executing a content component the same as or similar to content component 138 (shown in FIG. 1 and described herein).

At an operation 216, presence of a marker within the real-world environment may be detected. In some implementations, operation 216 may be performed by one or more physical processors executing a detection component the same as or similar to detection component 140 (shown in FIG. 1 and described herein).

At an operation 218, a real-world location of the marker within the real-world environment may be determined. In some implementations, operation 218 may be performed by one or more physical processors executing detection component the same as or similar to detection component 140 (shown in FIG. 1 and described herein).

At an operation 220, the real-world location of the marker may be specified as a first reference point within the real-world environment so that the virtual environment may be specified with respect to the real-world location of the marker. In some implementations, operation 220 may be performed by one or more physical processors executing a map component the same as or similar to map component 142 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a shared augmented reality experience across multiple presentation devices, the system comprising:
   non-transitory electronic storage storing virtual content information, the virtual content information defining a virtual environment including virtual content, the virtual content including one or more virtual objects;
   a presentation device, the presentation device being configured to generate images of the virtual content and present the images such that the virtual content is perceived by a user as being located in a real-world environment;
   one or more physical processors configured by machine-readable instructions to:
      obtain input to specify a pose of a virtual object, the pose of the virtual object including an object location of the virtual object within the real-world environment and an object heading of the virtual object;
      effectuate presentation of a marker on a display of the presentation device, the marker having a marker heading;
      determine a real-world marker location of the marker presented on the display of the presentation device and compare the real-world marker location of the marker to the object location of the virtual object to determine if the real-world marker location of the marker and the object location of the virtual object match as a same location, wherein the real-world marker location of the marker is a location of the presentation device; and
      responsive to determining the real-world marker location of the marker presented on the display of the presentation device matches the object location of the virtual object as being the same location, modify the presentation of the marker presented on the display of the presentation device such that the marker heading of the marker matches the object heading of the virtual object.

2. The system of claim 1, wherein:
   the non-transitory electronic storage further stores environment record information defining a composition of the real-world environment, the composition of the real-world environment including one or more reference points, the one or more reference points including the object location of the virtual object within the real-world environment.

3. The system of claim 1, wherein the input to specify the pose of the virtual object is user input via the display of the presentation device.

4. The system of claim 1, wherein the input to specify the pose of the virtual object is obtained automatically without user input.

5. The system of claim 1, wherein the one or more physical processors are further configured by the machine-readable instructions to:
   control the presentation device to generate an image of the virtual object.

6. A system configured to provide a shared augmented reality experience across multiple presentation devices, the system comprising:
   non-transitory electronic storage storing:
      environment record information, the environment record information defining a composition of a real-world environment, the composition of the real-world environment including one or more reference points; and
      virtual content information, the virtual content information defining a virtual environment including virtual content, the virtual content including one or more virtual objects, and wherein the virtual environment is specified with respect to the one or more reference points within the real-world environment;
   one or more physical processors configured by the machine-readable instructions to:

detect presence of a marker presented on a display of a presentation device within the real-world environment, the marker having a marker heading previously modified on the display to match an object heading of a virtual object;

determine a real-world marker location of the marker presented on the display of the presentation device, the real-world marker location of the marker being a location of the presentation device, wherein the real-world marker location of the marker has been determined to match an object location of the virtual object as being a same location based on a comparison of the real-world marker location of the marker to the object location of the virtual object; and specify, within the environment record information, the real-world marker location of the marker presented on the display of the presentation device as a first reference point within the real-world environment such that the virtual environment is specified with respect to the real-world marker location of the marker presented on the display of the presentation device.

7. The system of claim 6, further comprising:
a second presentation device, the second presentation device being configured to generate images of the virtual content and present the images such that the virtual content is perceived by a user as being located in the real-world environment; and
wherein the one or more physical processors are further configured by the machine-readable instructions to:
determine the marker heading of the marker presented on the display of the presentation device; and
control the second presentation device to generate an image of a second virtual object, the image being generated such that the second virtual object is posed in the real-world environment, a pose of the second virtual object including a second object location of the second virtual object within the real-world environment and a second object heading of the second virtual object, wherein the second object location is the real-world marker location of the marker and the second object heading is the marker heading.

8. The system of claim 6, further including an image sensor configured to generate output signals conveying image information, the image information defining one or more images of the real-world environment.

9. The system of claim 8, wherein detection of the presence of the marker and the determination of the real-world location of the marker are performed based on the image information.

10. The system of claim 6, wherein the presentation device is a mobile computing platform.

11. A method to provide a shared augmented reality experience across multiple presentation devices, the method comprising:
obtaining virtual content information, the virtual content information defining a virtual environment including virtual content, the virtual content including one or more virtual objects;
generating images of the virtual content and presenting the images such that the virtual content is perceived by a user as being located in a real-world environment;
obtaining input to specify a pose of a virtual object, the pose of the virtual object including an object location of the virtual object within the real-world environment and an object heading of the virtual object;

effectuating presentation of a marker on a display of a presentation device, the marker having a marker heading;

determining a real-world marker location of the marker presented on the display of the presentation device and comparing the real-world marker location of the marker to the object location of the virtual object to determine if the real-world marker location of the marker and the object location of the virtual object match as a same location, wherein the real-world marker location of the marker is a location of the presentation device; and responsive to determining the real-world marker location of the marker presented on the display of the presentation device matches the object location of the virtual object as being the same location, modifying the presentation of the marker on the display of the presentation device such that the marker heading of the marker matches the object heading of the virtual object.

12. The method of claim 11, further comprising:
obtaining environment record information, environment record information defining a composition of the real-world environment, the composition of the real-world environment including one or more reference points, the one or more reference points including the object location of the virtual object within the real-world environment.

13. The method of claim 11, wherein the input to specify the pose of the virtual object is user input via the display of the presentation device.

14. The method of claim 11, wherein the input to specify the pose of the virtual object is obtained automatically without user input.

15. The method of claim 11, further comprising:
controlling the presentation device to generate an image of the virtual object, the image being generated such that the virtual object has the pose.

16. A method to provide a shared augmented reality experience across multiple presentation devices, the method comprising:
obtaining:
environment record information, the environment record information defining a composition of a real-world environment, the composition of the real-world environment including one or more reference points; and
virtual content information, the virtual content information defining a virtual environment including virtual content, the virtual content including one or more virtual objects, and wherein the virtual environment is specified with respect to the one or more reference points within the real-world environment;
detecting presence of a marker presented on a display of a presentation device within the real-world environment, the marker having a marker heading previously modified on the display to match an object heading of a virtual object;
determining a real-world marker location of the marker presented on the display of the presentation device, the real-world marker location of the marker being a location of the presentation device, wherein the real-world marker location of the marker has been determined to match an object location of the virtual object as being a same location based on a comparison of the real-world marker location of the marker to the object location of the virtual object; and
specifying, within the environment record information, the real-world marker location of the marker as a first reference point within the real-world environment such that the virtual environment is specified with respect to the real-world marker location of the marker presented on the display of the presentation device.

17. The method of claim 16, further comprising:

generating images of the virtual content and presenting the images on a second presentation device such that the virtual content is perceived by a user as being located in the real-world environment;

determining the marker heading of the marker presented on the display of the presentation device; and controlling the second presentation device to generate an image of a second virtual object, the image being generated such that the second virtual object is posed in the real-world environment, a pose of the second virtual object including a second object location of the second virtual object within the real-world environment and a second object heading of the second virtual object, wherein the second object location is the real-world marker location of the marker and the second object heading is the marker heading.

18. The method of claim 16, further including obtaining output signals conveying image information, the image information defining one or more images of the real-world environment.

19. The method of claim 16, wherein the detection of the presence of the marker and the determination of the real-world location of the marker are performed based on the image information.

20. The method of claim 16, wherein the method is implemented in a second presentation device comprising a mobile computing platform.

* * * * *